United States Patent
Ito

(10) Patent No.: US 8,174,736 B2
(45) Date of Patent: May 8, 2012

(54) IMAGE READING APPARATUS

(75) Inventor: Sakae Ito, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 897 days.

(21) Appl. No.: 12/204,150

(22) Filed: Sep. 4, 2008

(65) Prior Publication Data

US 2009/0059317 A1    Mar. 5, 2009

(30) Foreign Application Priority Data

Sep. 5, 2007   (JP) .................................. 2007-230410

(51) Int. Cl.
*H04N 1/04* (2006.01)

(52) U.S. Cl. ........ 358/474; 358/498; 358/497; 399/122; 399/397

(58) Field of Classification Search .................. 358/474, 358/296, 497, 496, 486, 501, 505; 399/122, 399/397, 110, 405, 114, 25, 107
See application file for complete search history.

(56) References Cited

U.S. PATENT DOCUMENTS

| | | | | |
|---|---|---|---|---|
| 6,714,326 | B1 * | 3/2004 | Yamada | 358/498 |
| 7,046,941 | B2 | 5/2006 | Kameyama et al. | |
| 7,099,618 | B2 | 8/2006 | Iwago et al. | |
| 7,453,589 | B2 * | 11/2008 | Nakagawa | 358/1.14 |
| 7,828,421 | B2 * | 11/2010 | Hattori et al. | 347/86 |
| 7,957,666 | B2 * | 6/2011 | Sato et al. | 399/107 |
| 7,962,061 | B2 * | 6/2011 | Sato et al. | 399/107 |
| 7,995,949 | B2 * | 8/2011 | Shimizu | 399/111 |
| 2004/0130732 | A1 | 7/2004 | Denpo | |
| 2007/0045086 | A1 * | 3/2007 | Ishikawa | 198/784 |
| 2007/0058353 | A1 * | 3/2007 | Ikeno et al. | 361/752 |
| 2007/0070141 | A1 * | 3/2007 | Hattori et al. | 347/86 |
| 2007/0120901 | A1 * | 5/2007 | Sugiyama et al. | 347/85 |
| 2007/0122225 | A1 * | 5/2007 | Izuchi et al. | 400/624 |
| 2007/0134036 | A1 * | 6/2007 | Sato et al. | 399/367 |
| 2007/0229628 | A1 * | 10/2007 | Yano | 347/86 |
| 2008/0101822 | A1 * | 5/2008 | Sasaki | 399/258 |
| 2008/0117404 | A1 * | 5/2008 | Nakahara et al. | 355/75 |

FOREIGN PATENT DOCUMENTS

JP    2004-212494 A    7/2004

* cited by examiner

*Primary Examiner* — Negussie Worku

(74) *Attorney, Agent, or Firm* — Banner & Witcoff, Ltd.

(57) ABSTRACT

An image reading apparatus is configured to read an image of a document. The image reading apparatus includes a main body, a document receiving surface configured to receive a document to be read, an operation panel disposed on the main body and a document cover configured to move between a first position covering the document receiving surface and a second position exposing the document receiving surface. The operation panel has a first inclined surface inclined relative to the document receiving surface and operation keys arranged on the first inclined surface. The document cover has a second inclined surface inclined relative to the document receiving surface. When the document cover is in the first position, the second inclined surface may generally align with the first inclined surface, may be immediately adjacent to the first inclined surface, and may be inclined less than the first inclined surface relative to the document receiving surface.

21 Claims, 5 Drawing Sheets

Fig.4
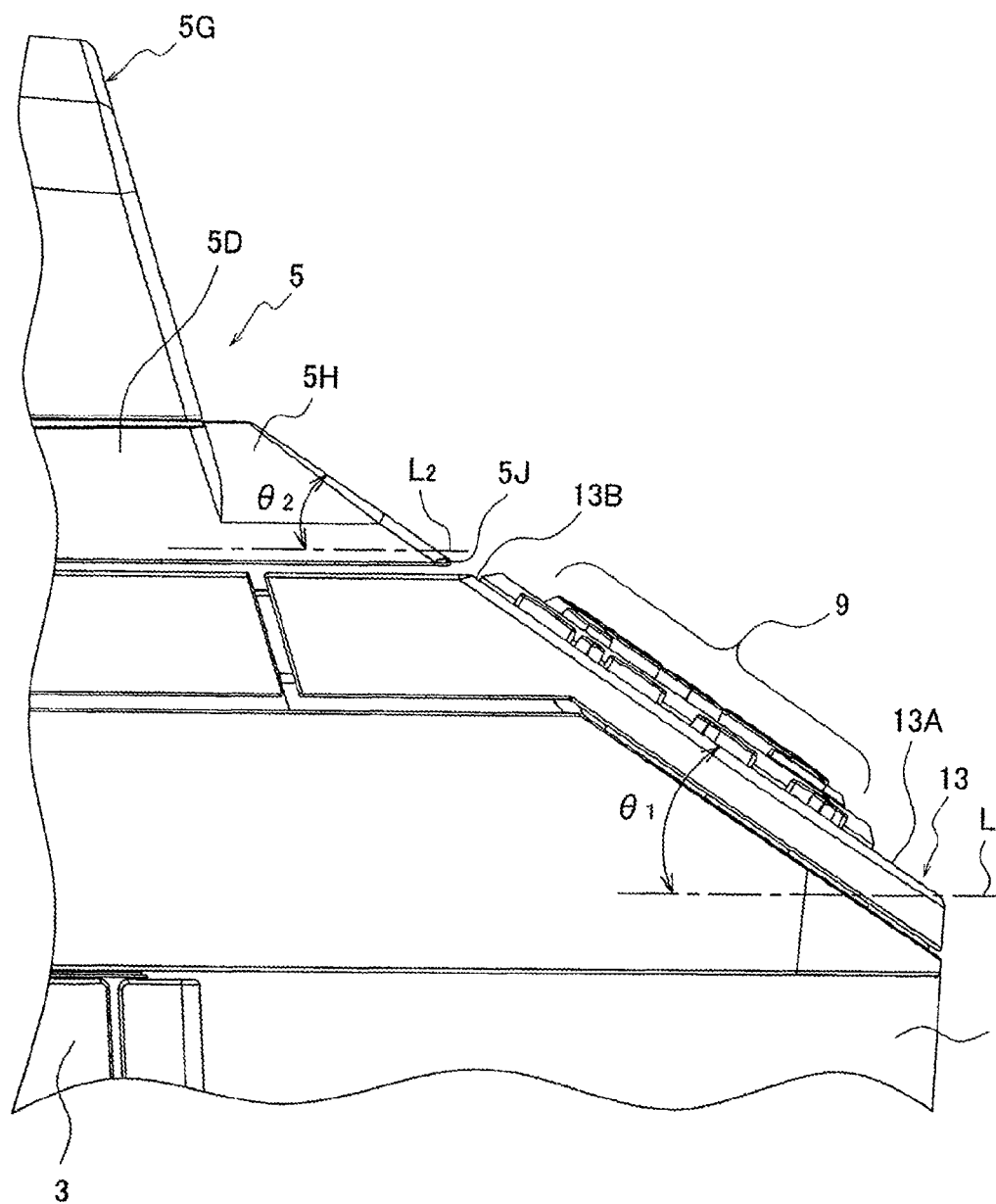
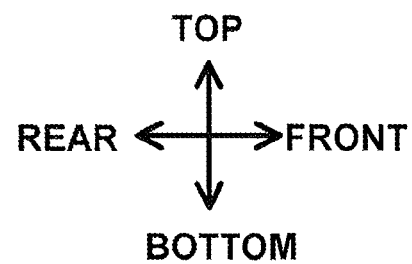

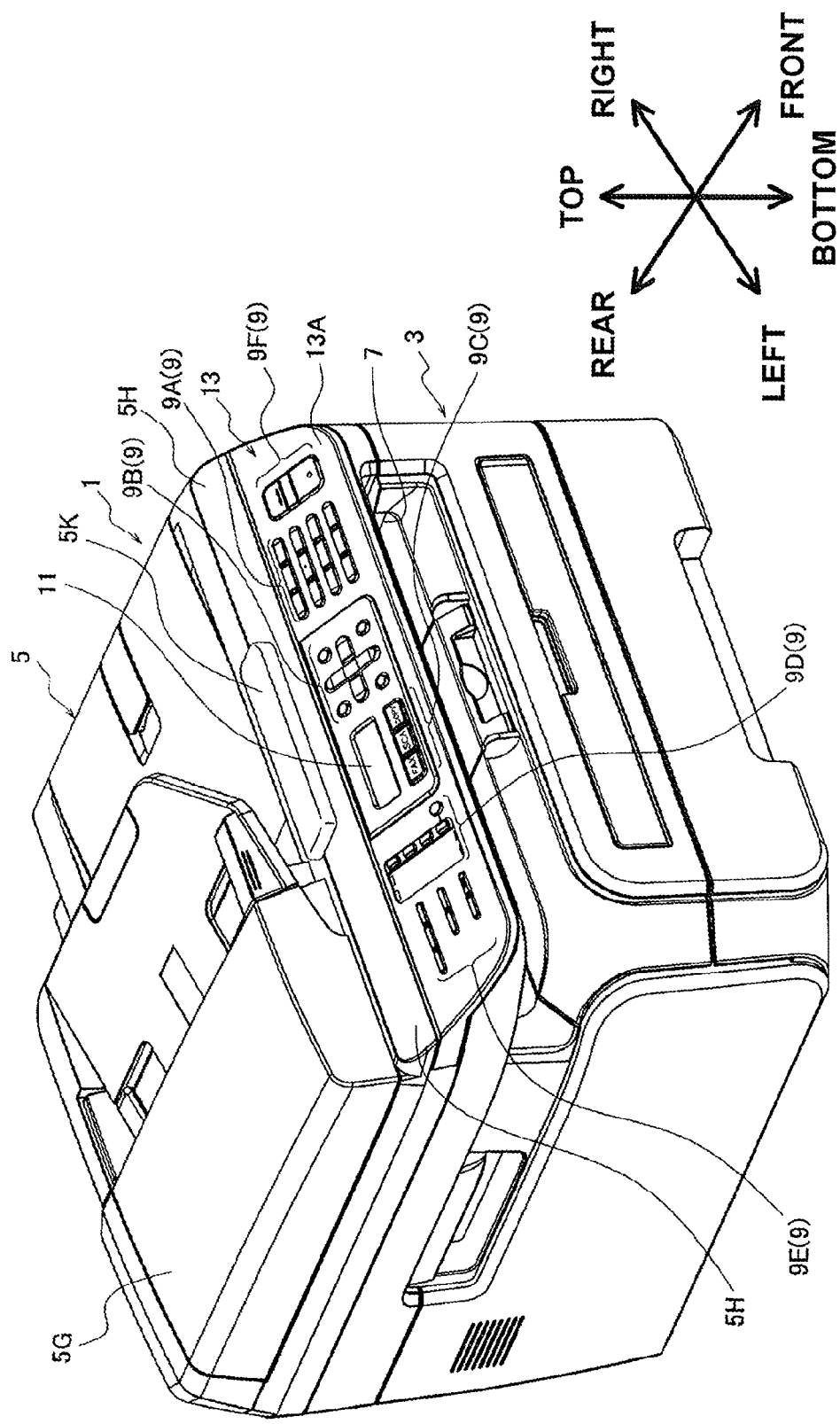

IMAGE READING APPARATUS

CROSS REFERENCE TO RELATED APPLICATION

This application claims priority from Japanese Patent Application No. 2007-230410, filed on Sep. 5, 2007, the entire subject matter of which is incorporated herein by reference.

FIELD

Aspects of the invention relate to flatbed-type image reading apparatuses configured to read an image on a document placed at rest.

BACKGROUND

A known flatbed-type image reading apparatus or multifunction apparatus combining a flatbed-type image reading apparatus and an image forming apparatus includes a document receiving portion and a document cover. A document to be read is placed on the document receiving portion. The document cover is configured to pivot between a position to cover the document receiving portion and a position to expose the document receiving portion.

The image reading apparatus or the multifunction apparatus includes an operation panel with operation keys on a front face. An upper face of the operation panel is connected to the document receiving portion.

The document cover of the image forming apparatus is relatively thick. When the document receiving portion is covered with the document cover, the outer surface of the document cover is a wall surface protruding upward in a boundary between the document receiving portion and the operation panel and perpendicular to the document receiving portion.

If the size of the operation panel is reduced, some of the operation keys disposed on the operation panel should be arranged close to the document receiving portion proximate to the document cover.

If the size of the operation panel is reduced, when the user wants to touch one of the operation keys arranged proximate to the boundary between the document receiving portion and the operation panel, the user's fingers may easily contact an outer surface of the document cover, which is like a wall, preventing the keys from being easily operated. Thus, a reduction in size of the operation panel may lead to deterioration of the operability of the operation keys.

SUMMARY

Illustrative aspects of the invention provide an image reading apparatus that facilitate operability of operation keys on an operation panel.

BRIEF DESCRIPTION OF THE DRAWINGS

Illustrative aspects of the invention will be described in detail with reference to the following figures in which like elements are labeled with like numbers and in which:

FIG. 4 is an enlarged view of a part A of FIG. 3; and

FIG. 5 is a perspective view of a multifunction apparatus viewed from above according to another illustrative embodiment of the invention.

DETAILED DESCRIPTION

An illustrative embodiment of the invention will be described in detail with reference to the accompanying drawings. An image reading apparatus according to illustrative aspects of the invention may be a multifunction apparatus 1 where a printer unit 3 and a flatbed-type scanner unit 5 are combined. For ease of discussion, in the following description, directions are defined as viewed from the perspective of a user who would operate the multifunction apparatus 1. The top or upper side, the bottom or lower side, the left or left side, the right or right side, the front or front side, and the rear or rear side of the multifunction apparatus 1 are identified as indicated by the arrows in FIG. 1. With regard to various individual objects of the multifunction apparatus 1, sides of the individual objects are similarly identified based on the arranged/attached position of the object on/in the multifunction apparatus 1.

Figure 1:
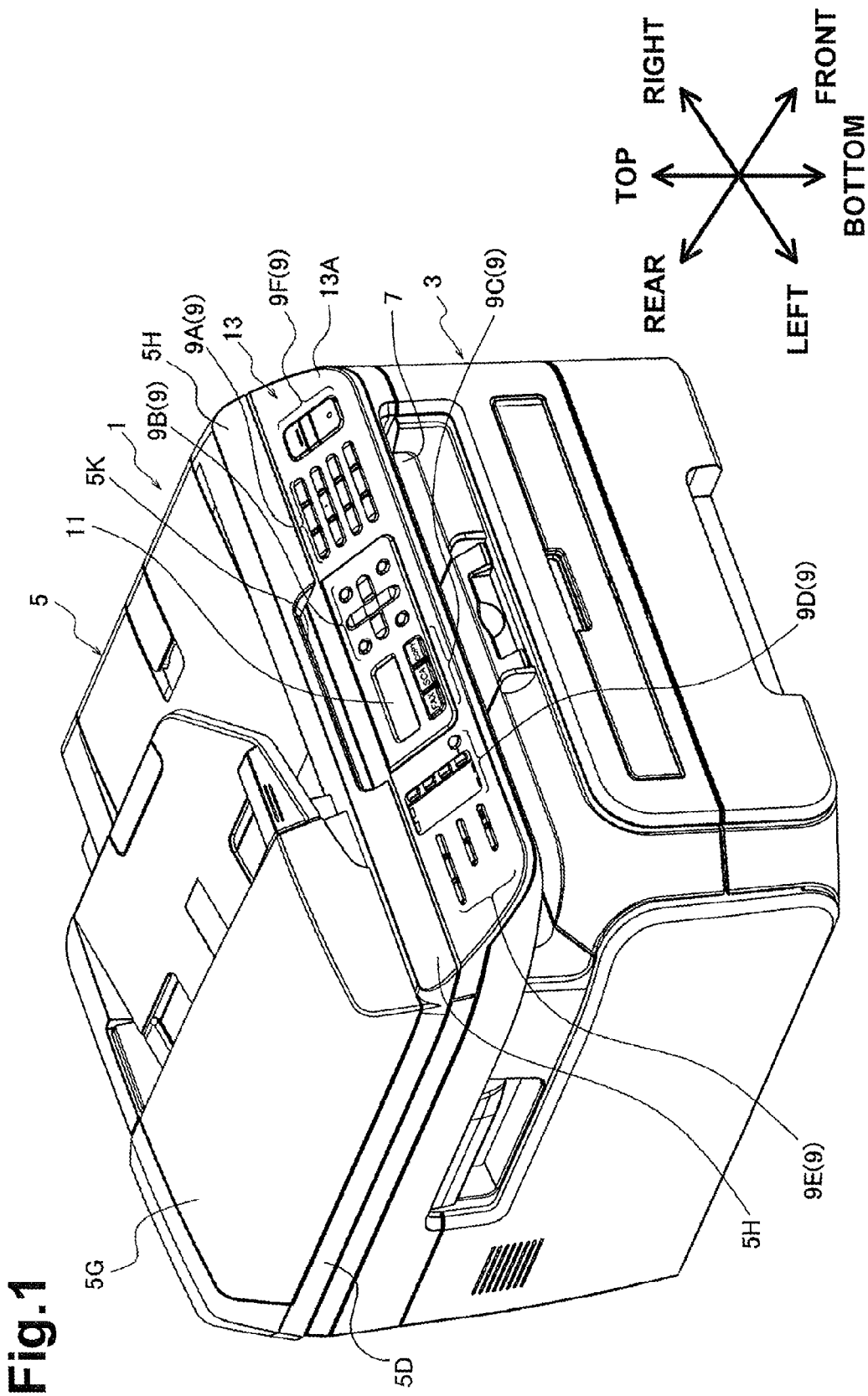
FIG. 1 is a perspective view of a multifunction apparatus viewed from above as an illustrative example of an image reading apparatus according to an illustrative embodiment of the invention.

As shown in FIG. 1, the multifunction apparatus 1 may include the printer unit 3, the scanner unit 5 disposed on the printer unit 3, and a sheet ejection portion 7 provided between the printer unit 3 and the scanner unit 5. A recording medium or sheet (hereinafter referred to as a sheet, e.g., plain, glossy, or transparency) on which an image has been formed or printed in the printer portion is ejected to the sheet ejection portion 7.

The printer unit 3 is an electrophotographic image forming apparatus configured to form an image on a sheet by transferring a developer image onto the sheet. The scanner unit 5 is a flatbed-type image reading apparatus configured to read an image on a document placed at rest.

A front surface of the multifunction apparatus 1 contains an operation panel 13 in an upper portion of the printer 3 or the sheet ejection portion. The operation panel 13 has an inclined surface 13A that is inclined with respect to a horizontal direction. The inclined surface 13A contains operation keys 9 and a display portion 11 for displaying information.

The operation keys 9 includes ten number keys 9A for inputting numbers from 0 to 9, selection keys 9B for selecting or switching contents in the display portion 11, mode selection keys 9C for selecting an operation mode of the multifunction apparatus 1, selection keys 9D for selecting a registered facsimile number, operation keys 9E for selecting an abbreviated operation mode, and start/stop keys 9F for indicating starting fax transmission or image reading or stopping an operation.

Figure 2:
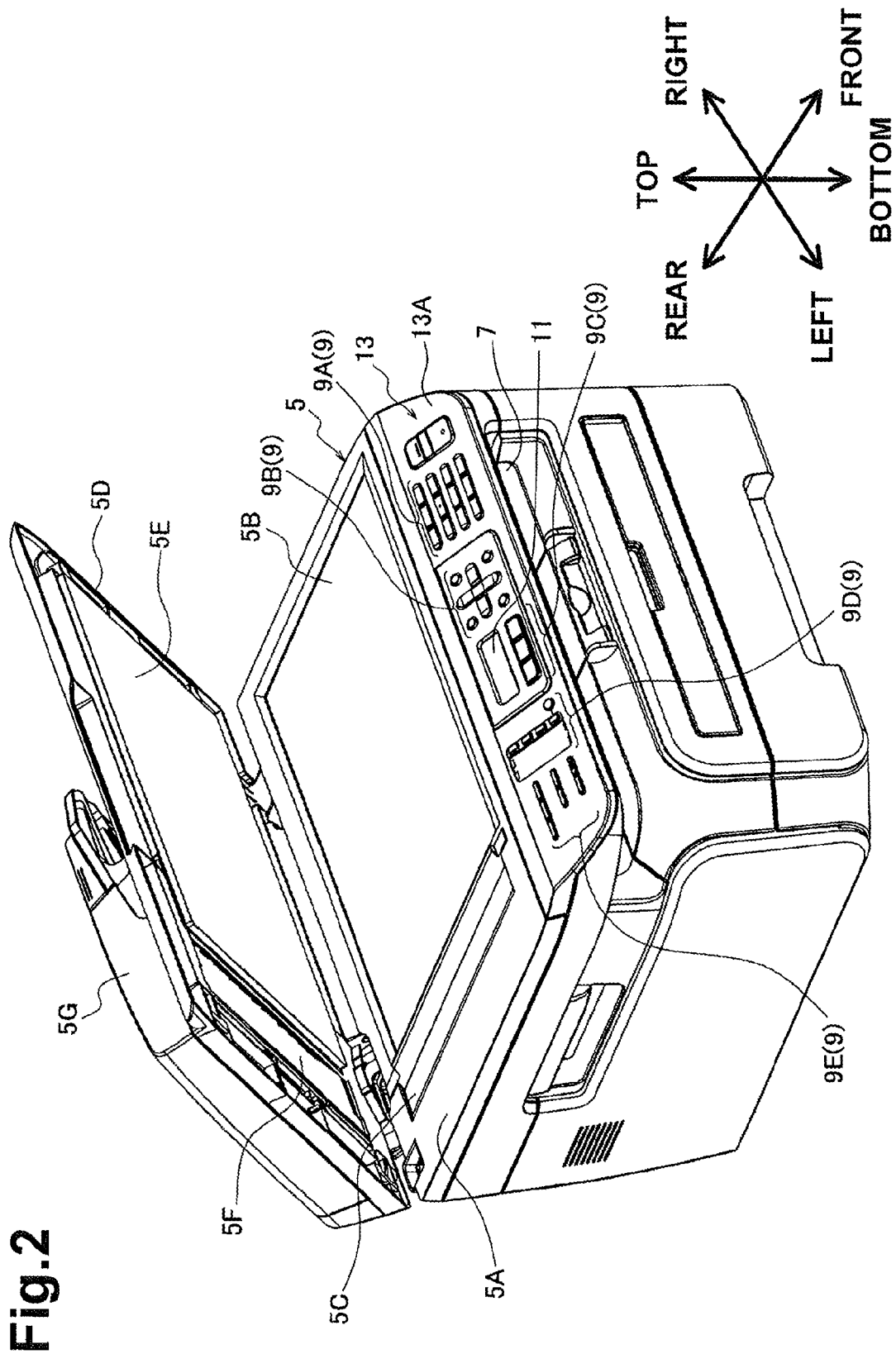
FIG. 2 is a perspective view of the multifunction apparatus where a document cover in a scanner portion is opened.
Figure 3:
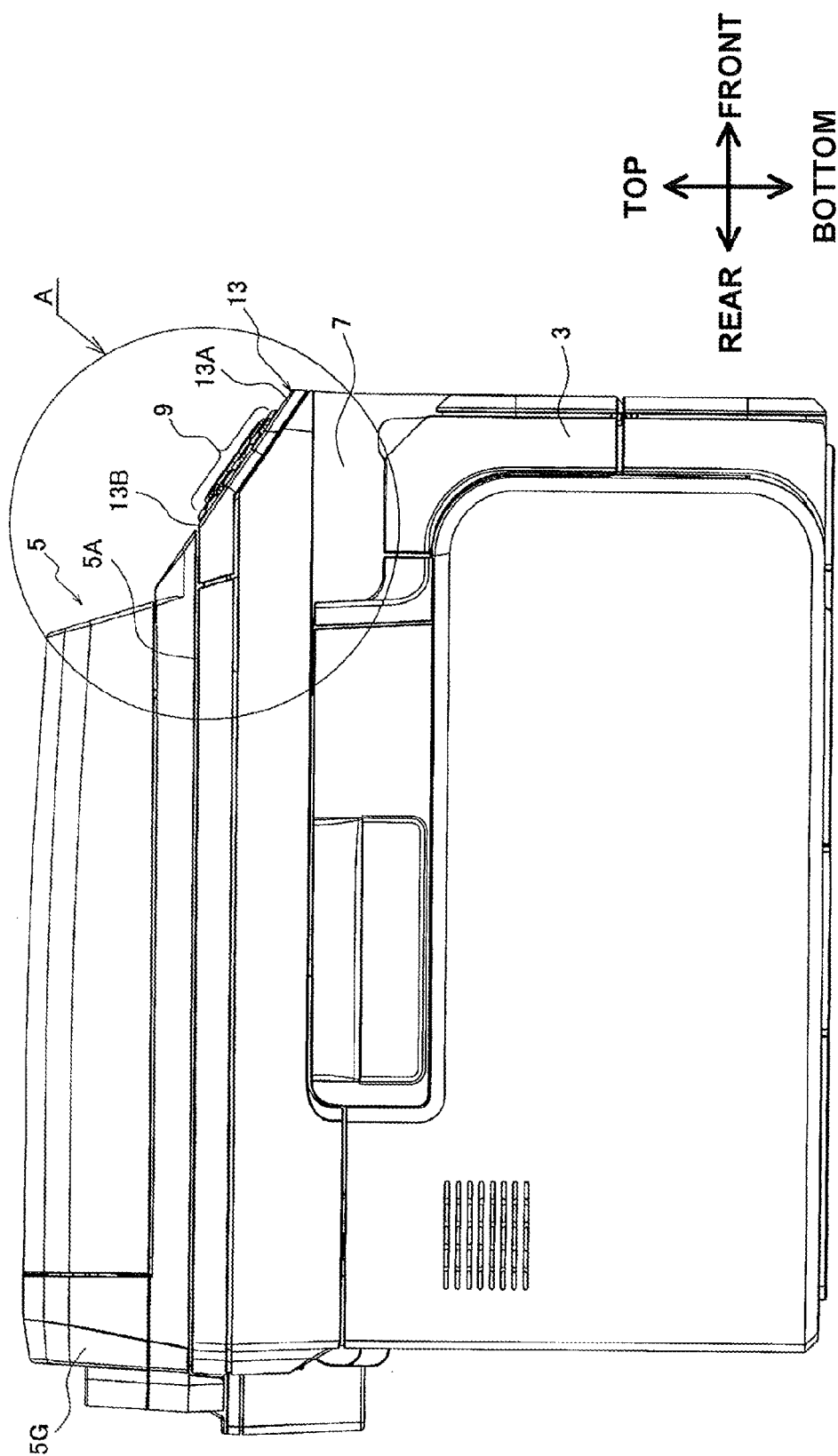
FIG. 3 is a left side view of the multifunction apparatus.

As shown in FIG. 2, the scanner unit 5 includes a document receiving portion 5A on which a document to be read is placed. The document receiving portion 5A is a document table that extends horizontally and is approximately level with an upper end of the operation panel 13.

The meaning of "approximately level with the upper end of the operation panel 13" includes a case that the document receiving portion 5A is vertically shifted a maximum of 2 mm with respect to a level surface including the upper end 13B, as well as a case that the document receiving portion 5A and an upper end 13B of the inclined surface 13A of the operation panel 13 are positioned at the same level.

The document receiving portion 5A includes an image reading window (platen) 5B made of a transparent material such as glass or acrylic. A document to be read is placed on the image reading window 5B at rest.

An image reading window 5C is disposed on one end of the image reading window 5B with respect to a longitudinal direction thereof (or a left-right direction of the multifunction apparatus 1). The image reading window 5C is configured to read a document automatically fed by an auto-document feeder 5G. A document automatically fed by the auto-document feeder 5G can be read while moving on the image reading window 5C.

A document cover 5D can be pivotally fixed to one end of the document receiving portion 5A with respect to a crosswise direction thereof (on a rear side of the multifunction apparatus 1). The document cover 5D is configured to move between a position covering the document receiving portion 5A (a state shown in FIG. 1) and a position exposing the document receiving portion 5A (a state shown in FIG. 2).

A lower surface of the document cover 5D includes document holding members 5E, 5F, which are configured to hold a document against the image reading windows 5B, 5C during image reading. An upper surface of the document cover 5D includes the auto-document feeder 5G in an area corresponding to the image reading window 5C.

As shown in FIG. 1, the document cover 5D has a generally rectangular shape when viewed from above. The document cover 5D includes a skirt portion 5H on an outer edge of the document cover 5D provided close to (e.g. nearest) the operation panel 13, that is, on a front side of the document cover 5D. The skirt portion 5H has an inclined surface that is inclined with an angle θ2 as shown in FIG. 4. The angle θ2 is generally identical to or not greater than an angle θ1 for the inclined surface 13A. Preferably, the angle θ1 is not greater than 60 degrees, and the angle θ2 is greater than 20 degrees. In FIG. 4, alternate long and short dashed lines L1 and L2 are phantom lines parallel to each other.

An end 5J of the skirt portion 5H extends to a position that generally aligns (e.g. is coplanar) with the upper end 13B of the operation panel 13 and may be immediately adjacent to, such as in contact with, the upper end 13B when the document receiving portion 5A is covered with the document cover 5D or the document cover 5D is closed.

The meaning of "the angle θ1 of the inclined surface 13A and the angle θ2 of the skirt portion 5H are generally identical" includes a deviation of approximately 5 degrees as well as a deviation due to manufacturing tolerances for design requirements. Thus, the angle θ2 is preferably in the range of 20-65 degrees. More preferably, the angle θ2 is in the range of 30-40 degrees. The meaning of "the end 5J of the skirt portion 5H extends to a position that generally aligns with the upper end 13B of the operation panel 13" includes a case where the end 5J of the skirt portion 5H can deviate approximately 2 mm to the front of or behind the upper end 13B of the operation panel 13 in the front/rear direction.

Further, as shown in FIG. 1, the skirt portion 5H can be disposed on the outer edge of the document cover 5D provided close to the operation panel 13 so as to cover the ten number keys 9A, the selection keys 9D, the operation keys 9E and the start and stop keys 9F.

The skirt portion 5H can be partially cut out to form a gripping portion 5K at a position corresponding to an area where the selection keys 9B and the display portion 11 are disposed. That is, when the document cover 5D is closed, the gripping portion 5K of the skirt portion 5H is located directly between the document receiving portion 5A and the display portion 11 of the operation panel 13. The user grips the gripping portion 5K to open or close the document cover 5D.

The skirt portion 5H having an inclined angle generally identical to that of the inclined surface 13A is disposed on part of the outer edge of the document cover 5D facing the operation panel 13. The end 5J of the skirt portion 5H extends to a position that generally aligns with the upper end 13B of the operation panel 13 with the document receiving portion 5A being covered with the document cover 5D.

When the document receiving portion 5A is covered with the document cover 5D, a front surface of the document cover 5D does not form a wall surface standing vertically, but instead forms a surface generally aligned, and that may form a continuous plane, from the inclined surface 13A of the operation panel 13 to the skirt portion 5H of the document cover 5D.

Thus, when the user operates one of the operation keys 9 arranged close to a boundary between the document receiving portion 5A and the operation panel 13, that is, the upper end 13B of the operation panel 13, even if the user touches the skirt portion 5H, the operability of the operation keys 9 may not be impaired. Thus, the operability of the operation keys 9 on the operation panel 13 can be improved.

The ten number keys 9A include at least ten different keys from 0 to 9, and thus a relatively large space for providing the ten number keys 9A is needed.

If the operation panel 13 is reduced in size, some of the ten number keys 9A arranged close to the upper end 13B of the operation panel 13 may be inevitably arranged close to the boundary between the document receiving portion 5A and the operation panel 13. Thus, it may be likely to impair the operability of some of the ten number keys 9A arranged close to the upper end 13B of the operation panel 13.

In the illustrative embodiment shown in FIG. 1, an end of the skirt portion 5H is disposed at a position to the top of an area where at least the ten number keys 9A are disposed. That is, a portion of the end of the skirt portion 5H, corresponding to an area where the ten number keys 9A are disposed, is disposed to the top of the area where the ten number keys 9A are disposed. As the skirt portion 5H is disposed at the position corresponding to the ten number keys 9A, which are often used, the operability of the ten number keys 9A can be prevented from being impaired.

The document cover 5D is provided with the gripping portion 5K, which is gripped by the user. The user can open and close the document cover 5D by moving the gripping portion 5K.

However, if the operation keys 9 are arranged close to the boundary between the document receiving portion 5A and the operation panel 13, when the user operates one of the operation keys 9, the user's fingers may contact the gripping portion 5K and thus the operability of the operation keys 9 may be impaired.

In the illustrative embodiment, the gripping portion 5K is disposed on a side of the document cover 5D facing the operation panel 13 and at the position corresponding to the area where the selection keys 9B and the display portion 11 are disposed. Thus, the operability of the operation keys 9 on the operation panel 13 can be improved.

The main feature of the display portion 11 is to display information. The display portion 11 is not operated like the operation keys 9 by the user.

As the gripping portion 5K is disposed at a position corresponding to an area where the display unit 11 is disposed, when the user's fingers contact the gripping portion 5K, the operability of the operation keys 9 will not be impaired. Thus, the operability of the operation keys 9 on the operation panel 13 can be improved.

In the above illustrative embodiment, the gripping portion 5K is disposed at the position corresponding to the area where the display portion 11 and the selection keys 9B are disposed, and the skirt portion 5H is not provided at the position where the gripping portion 5K is disposed. In a second illustrative embodiment as shown in FIG. 5, the skirt portion 5H is provided entirely on one side of the outer edge of the document cover 5D facing the operation panel 13. Thus, the gripping portion 5K can be a protruding handle in the second illustrative embodiment.

An image reading apparatus according to illustrative aspects of the invention applies to a multifunction apparatus where the printer unit 3 is disposed under the operation panel 13. However, it will be appreciated that illustrative aspects of the invention apply to an image reading apparatus having the scanner unit 5 only, without the printer 3.

As illustrated, the angle θ1 of the inclined surface 13A and the angle θ2 of the skirt portion 5H are generally identical to each other. However, the angle θ1 of the inclined surface 13A may be smaller than the angle θ2 of the skirt portion 5H. As illustrated, the skirt portion 5H is integrally formed with the document cover 5D. However, the skirt portion 5H may not be integrally formed with the document cover 5D.

While the features herein have been described in connection with various example structures and illustrative aspects, it will be understood by those skilled in the art that other variations and modifications of the structures and aspects described above may be made without departing from the scope of the invention. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. An image reading apparatus configured to read an image of a document placed at rest, the image reading apparatus comprising:
a main body;
a document receiving surface configured to receive a document to be read;
an operation panel disposed on the main body, the operation panel having a first inclined surface inclined relative to the document receiving surface and a plurality of operation keys arranged on the first inclined surface; and
a document cover configured to move between a first position covering the document receiving surface and a second position exposing the document receiving surface, the document cover having a skirt portion on an outer edge, the skirt portion having a second inclined surface inclined relative to the document receiving surface, wherein with the document cover in the first position, the second inclined surface is immediately adjacent to and generally aligns with the first inclined surface.

2. The image reading apparatus according to claim 1, wherein the first inclined surface is immediately adjacent to a front surface of the main body.

3. The image reading apparatus according to claim 1, wherein with the document cover in the first position, the second inclined surface is immediately adjacent to the document cover, and
wherein with the document cover in the second position, an upper end of the first inclined surface is level with the document receiving surface.

4. The image reading apparatus according to claim 1, wherein the operation keys include at least ten input keys configured to receive user input, and
the second inclined surface is provided in at least a position corresponding to an area where the ten input keys are disposed.

5. The image reading apparatus according to claim 1, wherein the operation panel includes a display portion configured to display information, and
the document cover includes a gripping portion positioned above a portion of the second inclined surface that in the first position is located directly between the document receiving surface and the display portion of the operation panel.

6. The image reading apparatus according to claim 1, wherein the operation panel includes a display portion configured to display information, and
the second inclined surface includes a gripping portion, the gripping portion being a portion of the second inclined surface that in the first position is located directly between the document receiving surface and the display portion of the operation panel.

7. The image reading apparatus according to claim 6, wherein a portion of an end of the second inclined surface corresponding to a location of the gripping portion is farther away from the operation panel in the first position than other portions of the end of the second inclined surface.

8. The image reading apparatus according to claim 1, wherein with the document cover in the first position, the second inclined surface is inclined 20-65 degrees relative to the document receiving surface.

9. The image reading apparatus according to claim 1, wherein with the document cover in the first position, the second inclined surface is inclined 30-40 degrees relative to the document receiving surface.

10. The image reading apparatus according to claim 1, wherein an upper end of the operation panel is approximately level with the document receiving surface.

11. The image reading apparatus according to claim 1, wherein the document cover rotates about an axis between the first position and the second position, and the axis is disposed in parallel with the first inclined surface and the second inclined surface.

12. The image reading apparatus according to claim 1, wherein with the document cover in the second position, the second inclined surface is farther away from the first inclined surface than with the document cover being in the first position.

13. The image reading apparatus according to claim 1, further comprising an image forming section configured to form an image on a recording sheet, the image forming section being disposed below a lower end of the operation panel.

14. The image reading apparatus according to claim 1, wherein with the document cover in the first position, the second inclined surface is coplanar with the first inclined surface.

15. An image reading apparatus configured to read an image of a document placed at rest, the image reading apparatus comprising:
a main body;
a document receiving surface configured to receive a document to be read;
an operation panel disposed on the main body, the operation panel having a first inclined surface inclined relative to the document receiving surface and a plurality of operation keys arranged on the first inclined surface; and
a document cover configured to move between a first position covering the document receiving surface and a second position exposing the document receiving surface, the document cover having a skirt portion on an outer edge, the shirt portion having a second inclined surface inclined relative to the document receiving surface, wherein with the document cover in the first position, the second inclined surface is immediately adjacent to the first inclined surface and the second inclined surface is inclined less than the first inclined surface relative to the document receiving surface.

16. The image reading apparatus according to claim 15, wherein the first inclined surface is immediately adjacent to a front surface of the main body.

17. The image reading apparatus according to claim 15, wherein with the document cover in the first position, the second inclined surface is immediately adjacent to the document cover, and
 wherein with the document cover in the second position, an upper end of the first inclined surface is level with the document receiving surface.

18. The image reading apparatus according to claim 15, wherein with the document cover in the first position, the second inclined surface is inclined 20-60 degrees relative to the document receiving surface.

19. The image reading apparatus according to claim 15, wherein with the document cover in the first position, the second inclined surface is inclined 30-40 degrees relative to the document receiving surface.

20. The image reading apparatus according to claim 15, wherein with the document cover in the first position, the second inclined surface is inclined at least 5 degrees less than the first inclined surface relative to the document receiving surface.

21. The image reading apparatus according to claim 1, wherein the outer edge includes a hard edge formed at a joining point between the skirt portion and a remainder of the document cover.

* * * * *

UNITED STATES PATENT AND TRADEMARK OFFICE
CERTIFICATE OF CORRECTION

PATENT NO.       : 8,174,736 B2
APPLICATION NO.  : 12/204150
DATED            : May 8, 2012
INVENTOR(S)      : Sakae Ito It is certified that error appears in the above-identified patent and that said Letters Patent is hereby corrected as shown below:

Column 6, Claim 15, Line 65:
      Please delete "the shirt portion" and insert --the skirt portion--

Signed and Sealed this
Twenty-fifth Day of December, 2012

David J. Kappos
*Director of the United States Patent and Trademark Office*